UNITED STATES PATENT OFFICE.

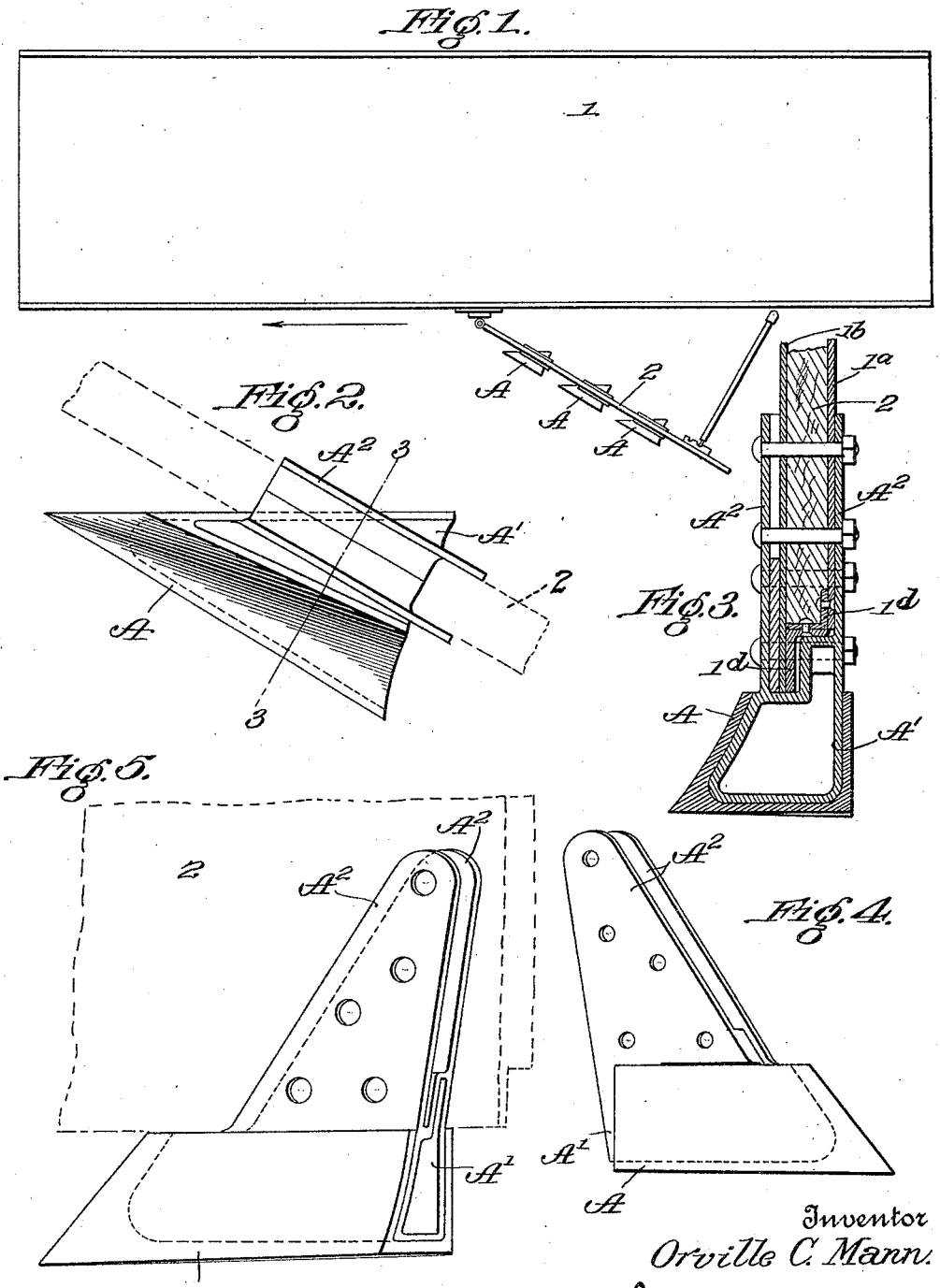

ORVILLE C. MANN, OF OAK PARK, ILLINOIS, ASSIGNOR TO EMMA I. MANN, OF OAK PARK, ILLINOIS.

CRUST-BREAKER ATTACHMENT FOR RAILWAY SPREADERS.

1,404,875.  Specification of Letters Patent.  Patented Jan. 31, 1922.

Application filed July 9, 1920. Serial No. 394,892.

*To all whom it may concern:*

Be it known that I, ORVILLE C. MANN, a citizen of the United States, residing in the village of Oak Park, in the county of Cook and the State of Illinois, have invented certain new and useful Improvements in Crust-Breaker Attachments for Railway Spreaders, of which the following is a specification, reference being had to the accompanying drawings, forming a part thereof.

The purpose of this invention is to provide an attachment for railway spreaders, designed and adapted for breaking up crusted areas alongside the track on which the car carrying the spreader operates, as for example, frozen ground, or areas on which slag has been deposited for cooling, or more or less rocky formation of a crust character. It consists in the elements and features of construction shown and described as indicated in the claims.

In the drawings:

Figure 1 is a plan view showing in outline a car and a spreader wing extending in the usual oblique position therefrom, and provided with the crust-breaking devices embodying this invention.

Figure 2 is a plan view of a breaker embodying this invention, shown detached from the spreader wing, the latter, however, being shown in dotted line in the position occupied when the breaker is attached.

Figure 3 is a section at the line 3—3 on Figure 2.

Figure 4 is an inner side elevation of the breaker.

Figure 5 is an outer side elevation of the breaker.

In the drawings there is shown in general outline a car, 1, having a spreader wing, 2, extended therefrom obliquely in the usual position of operation, the details of the spreader arm and its mode of operation or of any of the spreading devices connected therewith being omitted. A, A, A, are breakers embodying this invention, and shown attached to the spreader arm in position for performing their function of breaking up crust. Each of the breakers, A, comprises a central body member, $A^1$, having fork comprising arms, $A^2$, $A^2$, extending upwardly from it, positioned and formed to embrace between them the spreader arm, 2, and to be secured thereto by bolts extending through said lugs and spreader arms in any workmanlike manner. The detail construction of the spreader arm as to its lower or soil-engaging edge is one which is familiar, and the breaker body, $A^1$, is conformed thereto, said construction consisting in that the said spreader arm or wing is armoured upon both sides by metal plates $1^a$, $1^b$, the lower edge of the wing being armoured by means of two angle strips, $1^c$, $1^d$, having horizontal flanges bolted together and the vertical flange of one extending up embracing one corner of the lower edge of the spreader arm, under the armor plate $1^a$, and the other flange extending down and being lapped by the armour plate, $1^b$, forming with said armour plate the lower or working edge of the spreader arm. These features are not any essential part of the present invention; but, as stated, the form of the body member $A^1$ of the breaker is conformed thereto, as seen in Figure 3. The body member $A^1$ is armoured on two sides and the bottom, and when completed with said armour, the form is substantially and generally triangularly pyramidal with the apex or point forward, two of the three sides leading to said point being at right angles to each other, and the third slightly conically concave outward. One of the two first mentioned sides is the bottom, being substantially horizontal, and the other being vertical is positioned with respect to the lugs by which the breaker is secured to the spreader arm, so that when thus secured, said vertical side extends substantially parallel with the direction of travel of the car on the track. The angle of divergence between the said vertical side and the said concavely sloping side is somewhat greater than the angle of divergence of the spreader wing from the car, so that the outer or sloping side diverges outward rearwardly from the already diverging spreader arm, as may be seen in Figure 2.

The breaker thus described, it will be seen, presents a point adapted to penetrate the earth underneath any crust which is to be broken, and presents a cutting edge extending in an upward sloping direction rearward from said point in a plane parallel with the direction of advance of the breaker as it is carried by the spreader wing when the car is moving along the track for the work. It is thus calculated to upheave the crust along a line parallel to the direction of travel, and break it over the sloping cutting edge as it is thus upheaved or wedged upward by the advance of the breaker under it.

Several such breakers being attached, one behind the other along the spreader arm at suitable distances apart, serve to break up the crust over a considerable area as the car advances, the material thus broken up being upheaved in front of the advancing spreader so that the latter gathers and spreads the fragmentary material of the crust, delivering it outside the range or path of travel of the spreader, and clearing the ground down to the desired level determined by the mounting of the wing on the car.

I claim:

1. In combination with a railway car, a spreader wing carried thereby adapted to be extended off obliquely over the area adjacent to the track, and a device for breaking crusted areas, consisting of a breaker having three generally triangular faces converging to a point at the forward end, two of said faces being in planes at right angles to each other, and the third slightly concave outwardly, and means for mounting it on the spreader wing depending rigidly below the same, with one of said first two mentioned faces vertical and substantially parallel to the path of travel of the car, and the other of said two faces facing downwardly and horizontal.

2. In the construction defined in claim 1, the breaker having an upwardly-extending form whose arms embrace the spreader wing for securing the breaker thereto.

3. In the construction defined in claim 1 foregoing, the breaker comprising a central body having an upwardly-extending form whose arms embrace the spreader-wing for securement thereto, and an armor applied on said central body and affording the three triangular faces mentioned.

4. In combination with a railway car, a spreader wing carried thereby, adapted to be extended obliquely over an area adjacent to the track, and a plurality of crust-breakers, carried rigidly by said spreader wing depending therefrom at intervals in the length of said wing, each of said crust breakers consisting of a member having three substantially triangular faces converging to a point, two of said faces being in planes at right angles to each other, one horizontal and the other vertical and substantially parallel to the path of travel of the car.

In testimony whereof, I have hereunto set my hand at Chicago, Illinois, this 3rd day of July, 1920.

ORVILLE C. MANN.